United States Patent [19]

Agarwal et al.

[11] Patent Number: 5,051,296

[45] Date of Patent: Sep. 24, 1991

[54] NOVEL PRESSURE SENSITIVE ADHESIVE ARTICLES CONTAINING AN ADHESIVE LAYER BASED ON DIENE-ETHOXYLATED ALKYL AMINE STYRENE SULFONATE COPOLYMERS

[75] Inventors: Pawan K. Agarwal, Bridgewater; Warren A. Thaler, Flemington, both of N.J.

[73] Assignee: Exxon Research and Engineering Company, Florham Park, N.J.

[21] Appl. No.: 589,287

[22] Filed: Sep. 27, 1990

Related U.S. Application Data

[63] Continuation-in-part of Ser. No. 287,377, Dec. 21, 1988, abandoned.

[51] Int. Cl.$^5$ .............................. B32B 7/02; C08J 5/02
[52] U.S. Cl. .................................. 428/213; 428/355; 428/356; 524/66; 524/243
[58] Field of Search ................... 524/60, 66, 547, 243; 526/288; 428/213, 355, 356

[56] References Cited

U.S. PATENT DOCUMENTS 3,923,755 12/1975 Piloni ................................. 526/287
4,387,172 6/1983 Agarwal et al. ...................... 524/60

OTHER PUBLICATIONS

"McCutcheon's Emulsifiers & Detergents", McCutcheon Div., McPublishing Co., Glen Rock, NJ, 1982, p. 131.

*Primary Examiner*—Joseph L. Schofer
*Assistant Examiner*—R. H. Delmendo
*Attorney, Agent, or Firm*—Joseph J. Dvorak; Richard E. Nanfeldt

[57] ABSTRACT

This invention relates to emulsion type adhesive compositions which include a metal neutralized copolymer of a conjugated diene and an ethoxylated alkylamine salt of a styrene sulfonate, wherein the sulfonated copolymer has about 5 to about 125 meg. of sulfonate groups per 100 grams of the sulfonated copolymer, and about 25 to about 200 parts by weight of a hydrocarbon resin of a petroleum or coal tar distillate, having about 5 to 6 carbon atoms, the hydrocarbon resin being composed of aliphatic dienes and monoolefins per 100 parts by weight of the neutralized sulfonated copolymer.

6 Claims, No Drawings

NOVEL PRESSURE SENSITIVE ADHESIVE ARTICLES CONTAINING AN ADHESIVE LAYER BASED ON DIENE-ETHOXYLATED ALKYL AMINE STYRENE SULFONATE COPOLYMERS This application is a Continuation-in-Part application of U.S. Ser. No. 287,377 filed Dec. 21, 1988, now abandoned.

BACKGROUND OF THE INVENTION

1. Field of the Invention

This invention relates to emulsion type adhesive compositions which includes a copolymer of a hydrocarbon diene and an ethoxylated alkyl amine salt of styrene sulfonate which is prepared by an emulsion polymerization process, wherein the sulfonated copolymer is reacted with a metallic base to form an ethoxylated alkylamine and a metal neutralized sulfonated copolymer which has about 5 to about 125 meq. of metal neutralized sulfonate groups per 100 grams of the metal neutralized sulfonated copolymer and about 25 to about 200 parts by weight of a hydrocarbon resin of a petroleum or coal tar distillate, formed from dienes and monolefins generally about five and six carbon atoms per 100 parts by weight of the neutralized sulfonated copolymer.

Broadly speaking, synthetic adhesives used in packaging can be classified into four categories: water based emulsion system, solvent based, reactive and hot melt adhesives. Of these four, currently the water based are used most extensively. Usually the water based adhesives are based on emulsion polymers and are applied to porous cellulosic substrates. Energy from the outside in some fashion is applied to the system to evaporate the water in order that a strong bond may be formed.

With the solvent-based adhesives usually a good wetting is achieved; however, their use has been becoming extremely restrictive due to expensive energy requirements for the evaporation of organic solvents, fire hazards associated with the use of these organic solvents and emissions problems with said solvents. The strict government environmental regulations and restrictions concerning worker's exposure to solvent vapors, etc. has placed extra pressure on the packager to use non-solvent based adhesives.

The hot melt adhesives are generally applied (as the name implies) by conventional extrusion or coating techniques in the temperature range of 250° to 450° C. on one of the surfaces to be bonded. The other surface is brought in contact with the hot surface for a sufficient period of time for the melt to cool, where upon solidification, a strong and durable bond is formed.

As a result of various local and federal safety and environmental regulations, the polymers adhesive industry is moving from solvent to water-based technology. Usually the water based pressure sensitive adhesives are based on emulsion polymers and applied to porous cellulosic substrates. Energy is applied to the system to evaporate the water in order to form a strong bond. The key requirement of such an emulsion is that it form a uniform coating having good adhesive (tack) and cohesive characteristics. The degree of the adhesive and cohesive strength of the final adhesive product is established by its end use. For example, for general label applications, it is desired that the product have aggressive tack and not so much cohesive strength. However, for general tape uses, the composition should have good cohesive strength with marginal tack properties.

Currently in the market, there are very limited emulsion polymers available for water based adhesives. A few acrylic polymer emulsions are available which are suitable for label applications but these are relatively expensive. There is not a single water based polymeric adhesive available in the market which meets the requirements for tape applications, especially the tapes desired by the automotive painting industry.

2. Prior Art

Several U.S. patents have described sulfonated polymers such as sulfonated butyl polymers and sulfonated EPDM polymers in adhesive applications (e.g., U.S. Pat. No. 3,867,247 and U.S. Pat. No. 3,801,531). It is important to distinguish the instant invention over those prior art systems. The former patents are directed at a sulfonated butyl cement or EPDM terpolymer which is solvent based and is employed to laminate various substrates. It is important to note that the instant invention differs dramatically from these patents as follows:

(a) The adhesives of the instant invention are not deposited from solvents, but are water based emulsions;

(b) The instant invention may optionally include either a tackifier resin and/or plasticizer capable of associating with the neutralized sulfonate groups.

(c) The instant invention is directed to metal neutralized sulfonated elastomeric copolymers, whereas most of the prior art deals with sulfonated Butyl rubber (e.g., U.S. Pat. No. 3,867,247).

SUMMARY OF THE INVENTION

This invention relates to improvements in pressure sensitive type adhesive articles which include a substrate and an adhesive layer comprising a metal neutralized sulfonated copolymer of a conjugated diene and a sulfonated styrene, an ethoxylated alkylamine and a tackifier resin, wherein the sulfonated copolymer has about 5 to about 125 meq. of metal neutralized sulfonate groups per 100 grams of the sulfonated copolymer and from about 25 to about 200 parts by weight of a hydrocarbon tackifier resin of a petroleum or coal tar distillate, formed from dienes and monolefins generally about five and six carbon atoms, per 100 parts by weight of the metal neutralized sulfonated copolymer and optionally, about 0 to 25 parts of a preferential plasticizer per 100 parts of the metal neutralized sulfonated copolymer can be added to the composition.

GENERAL DESCRIPTION

The present invention relates to unique and novel emulsion type adhesive compositions which comprise an emulsion of a metal neutralized sulfonated copolymer of a conjugated diene and a sulfonated styrene and an ethoxylated alkylamine, and a hydrocarbon resin, wherein to the compositions can be optionally added an ionic preferential plasticizer, oil, and/or a filler, thereby modifying the properties of the emulsion type adhesive compositions.

SULFONATED POLYMER AND PROCESS FOR FORMING

The emulsion of the metal neutralized sulfonated copolymer and the ethoxylated alkylamine is formed by reacting a metallic base such as sodium hydroxide with a copolymer comprising at least one conjugated diene having from 4 to 12 carbon atoms and an ethoxylated alkylamine salt of styrene sulfonated characterized by the formula:

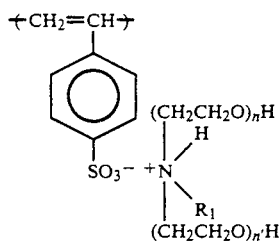

wherein n+n' is about 3 to about 50, more preferably about 3 to about 15 and most preferably about 3 to about 5 and $R_1$ is an alkyl group having about 10 to about 30 carbon atoms, more preferably about 12 to about 24, and most preferably about 12 to about 18, wherein the copolymer of the conjugated diene and the ethoxylated amine salt of the styrene sulfonate is reacted with a metallic base to form a metal neutralized sulfonated copolymer of the conjugated diene and styrene sulfonate and an ethoxylated alkylamine.

The metal neutralized sulfonated copolymer is water insoluble having at least 0.2 weight percent sulfur to less than about 4 weight percent sulfur chemically combined.

The instant invention relates to the formation of emulsions of sulfonate containing copolymers which are formed by a free radical emulsion copolymerization process. The monomers used in the free radical emulsion copolymerization processes are conjugated dienes which are copolymerized with sulfonate containing monomers.

The copolymerization of hydrocarbon monomers like butadiene or isoprene with a water soluble monomer like sodium styrene sulfonate is complicated by the mutual insolubility of the comonomers. Despite this, copolymers have been produced and are useful as pressure sensitive adhesives. However, the styrene sulfonate is consumed early in the polymerization, and the sulfonate content decreases with conversation. The resultant polymers are blocky and nonuniform in styrene sulfonate.

The use of oil soluble amine salts of styrene sulfonate is very effective for compatibilizing the comonomer; however the emulsions are of poor quality and low stability. Furthermore, post polymerization regeneration of the sodium sulfonate by addition of a base such as sodium hydroxide leaves a fatty amine residue which is deleterious to the product.

We have found that ethoxylated long chain amine salts of styrene sulfonic acid are excellent comonomers having both good compatibility with hydrocarbon monomers and good surfactancy. Furthermore, regeneration of a metal sulfonate after polymerization releases the ethoxylated amine which is also a good surfactant. The resulting emulsions can be formulated into good pressure sensitive adhesives. If an aliphatic amine salt suggests as disclosed in U.S. Pat. Nos. 4,387,174 and 4,387,172 are used in place of the ethoxylated alkylamine, then upon the addition of the metallic base an aliphatic amine is generated instead of the ethoxylated alkyl amine wherein a fatty oil amino residue will form upon the surface of the adhesive layer thereby destroying the adhesive bond between the adhesive layer and the two substrates being held together by the adhesive layer.

In general, the conjugated diene and the ethoxylated alkylamine salt of the sulfonate containing monomer are dispersed in a water phase in the presence of a water soluble initiator or a redox system which has one component soluble in the oil phase and one component soluble in the water phase, and either with or without surfactant, wherein the temperature is sufficient to initiate polymerization. To the resultant latex is first added the metallic base to form the emulsion of the metal neutralized sulfonated copolymer and the ethoxylated alkylamine to which is added an emulsion of the hydrocarbon tackifier resin and the resultant emulsion is doctor bladed onto a substrate and dried at room or elevated temperature to form the adhesive film.

The copolymers formed from the free radical emulsion copolymerization process of the instant invention can be generally described as having an $M_n$ as measured by GPC of about 1000 to about 1,000,000, more preferably about 10,000 to about 100,000. The copolymers of the instant invention contain about 0.2 to about 6 weight percent of the chemically combined sulfur, more preferably about 0.5 to about 4 and most preferably about 0.5 to about 3.0 weight percent sulfur. The copolymers of the instant invention are water insoluble, substantially gel free, thermally stable and oxidatively stable. Typically, the copolymerization of any conjugated diene as so defined herein, can be readily copolymerized with the sulfonate containing monomer as is defined herein. Terpolymers with styrene, acrylonitrile, vinyl chloride, as the termonomers with the aforementioned dienes, are also contemplated provided that no more than 25 weight percent of the termonomer is combined therein.

CONJUGATED DIENES

The conjugated dienes of the instant invention are generally defined as acyclic conjugated dienes containing from about 4 to about 10 carbon atoms more preferably about 4 to about 6 carbon atoms. Typical, but non-limiting examples of acyclic conjugated dienes are 1,3-butadiene, isoprene (2-methyl-1,3-butadiene), 2,3-dimethyl, 1,3-pentadiene, 2-methyl-1,3-pentadiene, 2,3-dimethyl-1,3-pentadiene, 3-methyl-1,3-pentadiene, 2-phenyl butadiene, chloroprene. Typical, but non-limiting examples of cyclic conjugated dienes are cyclopentadiene and methyl cyclopentadiene. The preferred conjugated dienes of the instant invention are selected from the group consisting of 1,3-butadiene, isoprene and chloroprene. In the formation of the sulfonate containing copolymer, one copolymerizes one of the aforementioned conjugated dienes with the sulfonate containing monomer. Sulfonate containing terpolymers can be readily formed by copolymerizing the sulfonate containing monomer with a mixture of two of the above identified conjugated dienes. Combinations of butadiene and isoprene are particularly desirable since isoprene provides good tack and butadiene lower cost.

Alternatively, other co or terpolymer of vinyl monomers such alkyl acrylates or methacrylates, or alkyl acrylate amides having about 4 to about 12 carbon atoms could be copolymerized with sulfonate containing monomers.

SULFONATE CONTAINING MONOMERS

The sulfonate containing monomers of the instant invention which are water soluble ethoxylated alkylamine salts of styrene sulfonated characterized by the formula:

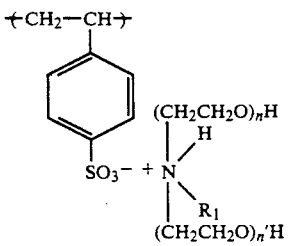

wherein $n+n'$ is about 3 to about 50 more preferably about 3 to about 15 and most preferably about 3 to about 5, and $R_1$ is an alkyl group having about 10 to about 30 carbon atoms more preferably about 12 to about 24, and most preferably about 12 to about 18.

The surfactants employed for this invention are varied and well-known in the art. The typical emulsifiers or surfactants can be employed, however, some are more effective than others in generating latexes of better stability. A preferred emulsifier is sodium lauryl sulfate. This copolymerization can also be conducted without emulsifier because of the surfactancy of the sulfonate monomer.

Buffering agents can be employed in the instant polymerization process and are selected from the group consisting of sodium carbonate, ammonia, sodium acetate, trisodium phosphate etc. When utilized, these buffering agents are employed at a concentration of about 0.1 to about 5 grams per 100 grams water employed in the emulsion system.

Chain transfer agents can be readily employed in the instant polymerization process for controlling the molecular weight of the resultant copolymer. The concentration of chain transfer agent is from 0 to about 1.0 grams per 100 grams of the combined weight of the sulfonate containing monomer and the conjugated diene.

The free radical emulsion copolymerization of the sulfonate monomer and the conjugated diene yields a stable latex, wherein the resultant copolymer is not covalently cross-linked and possesses substantial ionic crosslinking, and has about 0.2 to about 6 weight percent of chemically combined sulfur, more preferably about 0.5 to about 4. The sulfonated copolymer of the conjugated diene and the ethoxylated alkylamine salt of the styrene sulfonated is reacted with a metallic base of Groups I and II of the Periodic Table to form an emulsion of a metal neutralized sulfonated copolymer and an ethoxylated alkylamine and to this emulsion is added an emulsion hydrocarbon of the tackifier resin to form the emulsion type adhesive composition.

COMMERCIAL TACKIFIER RESINS

To the emulsion of the metal neutralized sulfonated elastomeric copolymer and ethoxylated alkylamine is added an emulsion of a commercial tackifying resin having a softening point of about 0° C. to about 160° C., more preferably about 50° C. to about 140° C. and most preferably about 70° C. to 120° C. A variety of commercial tackifier resins are available. Some of these resins contain α and/or β pinene or rosin derivatives as the base ingredient, while others are derived from the polymerization of petroleum or coal distillates which consist of aliphatic dienes, mono- and diolefins and cyclic olefins having about 5 to about 6 carbon atoms. The latter type of tackifiers have primarily piperyline and/or isoprene structure. A general but excellent description of tackifying resins derived from petroleum derivatives can be found in, for example, *Encyclopedia of Polymer Science and Technology*, Vol. 9, pages 853 to 860, chapter by John Findlay, published by John Wiley & Sons, N.Y. (1968).

Typical but non-limiting tradenames of these commercial tackifiers are Wingtack of Goodyear, Escorez of Exxon, Piccolyte of Hercules and Zonarez of Arizona Chemicals. Recently, these and various other companies have also started marketing relatively higher softening point resins. These are generally modified aliphatic hydrocarbon resins and/or hydrogenated polycyclics. The physical appearance of these commercial tackifying resins varies, depending upon their softening point, they can be either viscous liquids or light-colored solids at room temperature. Most often, their initial color (Gardner) is about 3.0 to about 7.0 and the density from about 0.7 to 1.0 gm/cm³ at room temperature. The acid number of these resins is usually less than 1. In general, the molecular weight of these commercial tackifying resins is not homogenous, the number average molecular weight $M_n$, as measured by GPC, can be from about 300 to about 5000, and more preferably about 500 to about 2000, and most preferably about 700 to 1600.

As well-known to those familiar with the use of tackifying resins, because of their wide range compatibility, any of these can be used with sulfonated polymers in proper formulation, which will yield adhesive systems of varying physical characteristics. To cite an example in the present invention, the tackifying resins used are those based on hydrocarbon resins.

These hydrocarbon tackifier resins are incorporated into the emulsion type adhesive composition at about 25 to about 200 parts by weight per 100 parts by weight of the metal neutralized sulfonated copolymer.

In forming the emulsion type adhesive composition of the metal neutralized sulfonated elastomeric copolymer, the ethoxylated alkylamine and the tackifier resin, the tackifier resin is dissolved in a hydrocarbon solvent such as toluene at a concentration level of about 1 to about 50 grams per 100 ml. of solvent, for example 10 grams. The solution of tackifier resin is added to the emulsion of the metal neutralized sulfonated copolymer and the ethoxylated alkylamine and vigorously mixed to form the emulsion type adhesive composition.

METHOD OF APPLICATION

The emulsion of the neutralized sulfonated elastomeric copolymer ethoxylated alkylamine and tackifier resin is doctor bladed to the required thickness onto a substrate and the formed adhesive film is dried at room temperature or elevated temperature either under vacuum or at atmospheric pressure for a sufficient period of time in order to remove the water from the adhesive film.

Most preferably the drying or fusion temperature of the emulsion layer of the neutralized sulfonated elastomeric copolymer, ethoxylated alkylamine and the hydrocarbon tackifying resin is about 50° to about 250° C. and the time of drying or fusion is about 10 seconds to 10 minutes, wherein the drying or fusion is preferably conducted at the temperature of greater than 50° C. for at least 30 seconds. The thickness of the adhesive layer formed by the drying or fusion of the emulsion layer of the metal neutralized sulfonated copolymer, ethoxylated alkylamine and the hydrocarbon tackifying resin is about 0.1 mil. to 10 mil. Typical substrates, upon which the emulsion layer can be deposited on one or both of the surfaces of the substrate to form an article such as a pressure sensitive tape, are plasticized polyvinylchloride, mylar, cellulose acetate, polyethylene, polypropylene and paper.

DETAILED DESCRIPTION OF THE PREFERRED EMBODIMENTS

As exemplified in the following illustrative examples, a series of emulsion type adhesive compositions were prepared.

EXAMPLE 1

Preparation of Emulsion Copolymer

An emulsion copolymerization was carried out by combining 98 g water, 5.88 g sodium styrene sulfonate, 12.2 g Ethomeen c/15, which is a polyethoxylated cocoamine salt having an average of 5 oxyethylene units and sold by Armak Industrial Chemicals, Rutherford, N.J., 2.86 g HCl solution, 1.56 g dodecyl mercaptan, 0.244 g potassium persulfate, and 66.6 g isoprene. The combination was heated and agitated at 65° C. The product was stabilized with 2.26 g of a shortstop solution (8 g hydroquinone and 12 g BHT/liter methanol). The sodium salt was generated by the addition of 4.58 g 50% NaOH solution.

EXAMPLE 2

Formulation of Copolymer with Escorez Resin

The emulsion from Example 1 containing 45.5% solids was blended with an emulsion Escorez 1310 (58.3% solids) on a 1:1 solids basis using 20 ml of 1310 emulsion and 25.6 ml of Example 1 emulsion. Samples were cast within 20 minutes of mixing.

Escroex 1310, of course, is a commercially available tackifier formed by cationic polymeriztion of aliphatic dienes and is sold by Exxon Chemical Company U.S.A., Houston, Tex.

EXAMPLE 3

Preparation of Adhesives

Desired quantities of emulsion were cast on 1.5 ml thick mylar film using an adhesive drawdown blade. Wet adhesive film thickness was determined such that dry adhesive film was 1.0-1.5 mil thick. The adhesive was dried and polymer and resin fused by exposure to 100° C. for two minutes. Appropriate test specimens were then prepared, and standard pressure sensitive adhesive tests were run.

| Sample (Exp 2)[a] | 180° Peel | 90° Peel | Rolling Ball | Polyken | Hold to Steel |
|---|---|---|---|---|---|
| 1.5 ml | 1.7 lbs. | 1.1 lbs. | 1.3 cm | 493 | — |
| 1.0 ml | 1.0 lbs. | 0.7 lbs. | 1.7 cm | 254 | 25.8 |

[a] Excellent drawdown, excellent peel test, no adhesive transfer or tracking.

EXAMPLE 4

An emulsion copolymer of isoprene and an octylamine salt of styrene sulfonated (50 isoprene/50 styrene sulfonated) was prepared according to the procedure of U.S. Pat. No. 4,387,172. The emulsion of the copolymer was reacted with a 50% NaOH solution to form an emulsion of octylamine and a sodium neutralized sulfonated copolymer of isoprene and styrene sulfonate which was blended on a 1:1 basis with an emulsion of Escorez 1310 (58.3% solids). The emulsion of the metal sulfonated copolymer, octyl amine and Escorez 1310 were cast on 1.5 ml thick mylar film and dried according to the procedure of Example III.

| Sample | 180° Peel | 90° Peel | Rolling Ball | Polyken | Hold to Steel |
|---|---|---|---|---|---|
| 1.0 ml | 0.45 lbs | 0.17 lbs | 30+ cm | 78 | 2.5 |

What is claimed is:

1. In a pressure sensitive adhesive article having a dried pressure sensitive adhesive layer deposited on a substrate, the improvement wherein said dried pressure sensitive adhesive layer comprises a mixture of:
   (a) a metal neutralized sulfonated copolymer of at least one conjugated diene having from 4 to 12 carbon atoms and an ethoxylated alkyl amine salt of styrene sulfonate, said neutralized sulfonated copolymer having about 5 to about 125 meq of neutralized sulfonate groups per 100 grams of said neutralized sulfonated copolymer;
   (b) an ethoxylated alkyl amine; and
   (c) a hydrocarbon tackifier resin based on a petroleum or coat tar distillate.
2. The article of claim 1 wherein said layer comprises about 25 to about 200 parts by weight of the hydrocarbon tackifying resin per 100 parts by weight of said metal neutralized sulfonated copolymer.
3. The article of claim 2 wherein said conjugated diene is selected from the group consisting of 1,3-butadiene, isoprene and chloroprene and mixtures thereof.
4. The article of claim 2 wherein said conjugated diene is isoprene.
5. The article of claim 2 wherein said layer is about 0.1 to 10 mil thick.
6. The article of claim 1 wherein the ethoxylated alkylamine has from about 3 to about 50 ethoxy groups and the alkyl group has from 10 to about 30 carbon atoms.

* * * * *